July 16, 1963  M. A. PROVI  3,097,966
PORTABLE STAND-UP TYPE BATHROOM SCALE
Filed May 20, 1960  2 Sheets-Sheet 1
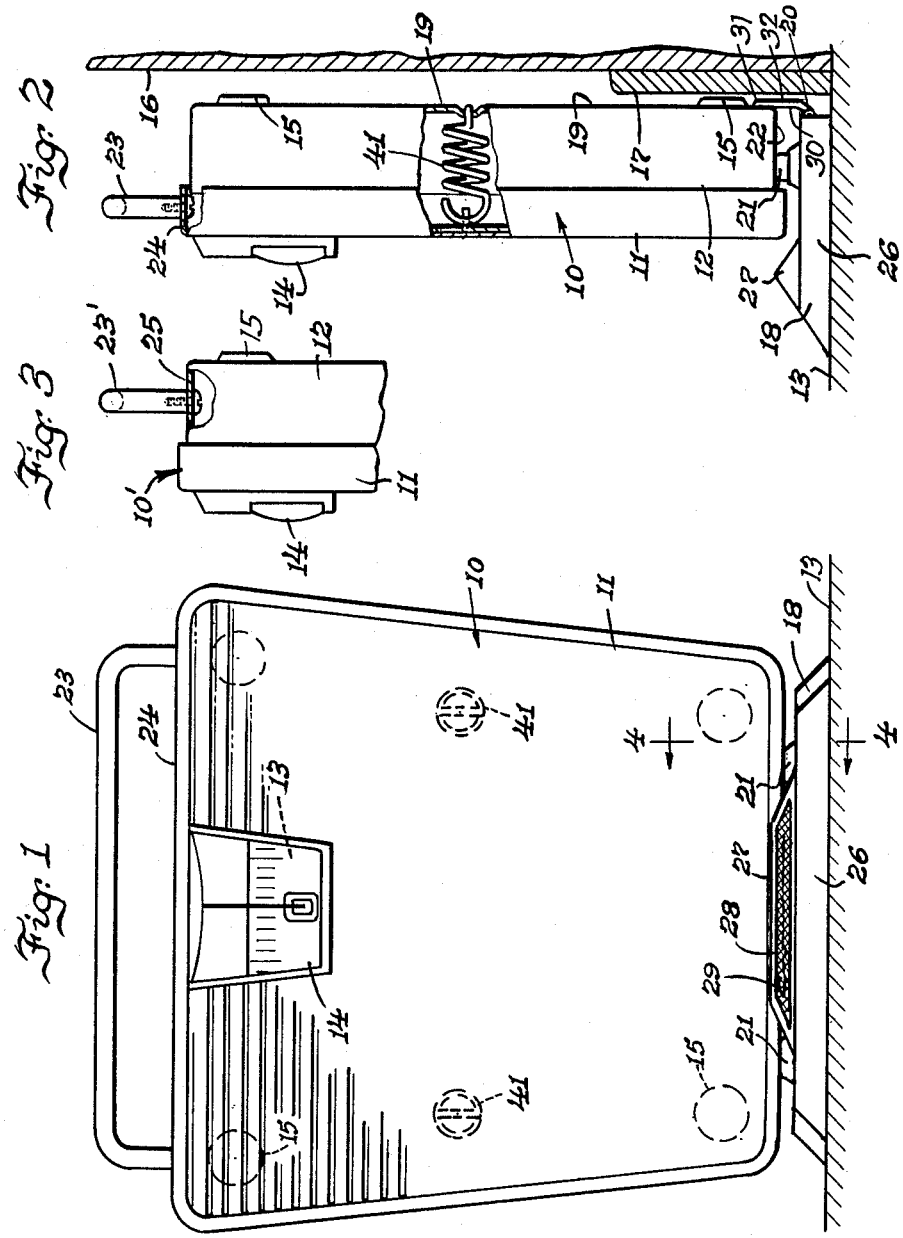
Inventor
Mike A. Provi July 16, 1963 M. A. PROVI 3,097,966
PORTABLE STAND-UP TYPE BATHROOM SCALE
Filed May 20, 1960 2 Sheets-Sheet 2
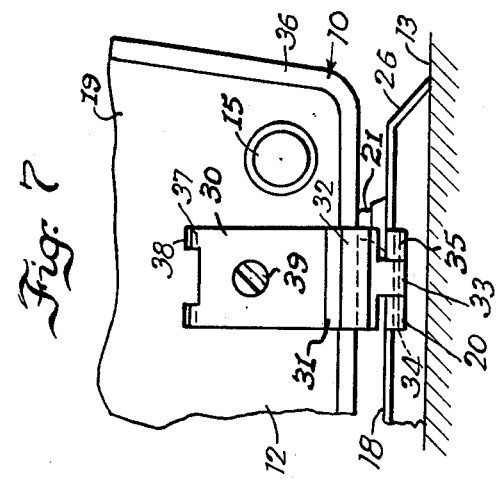
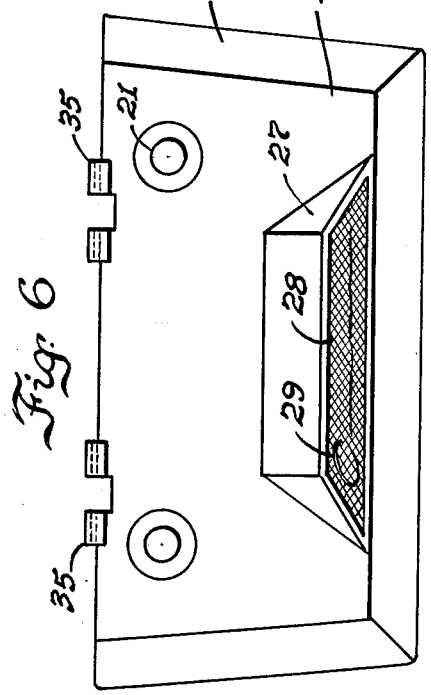
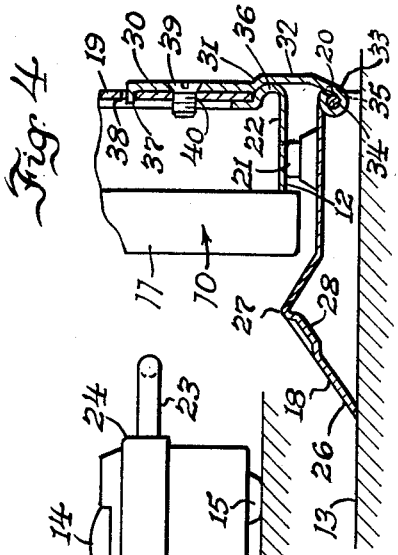
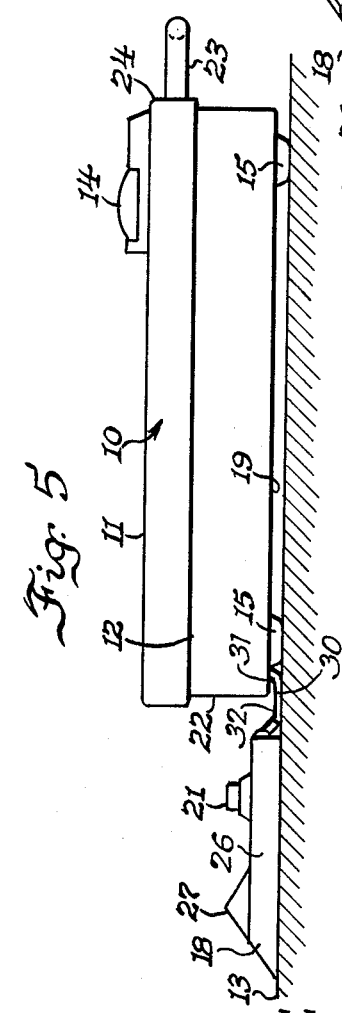
Inventor
Mike A. Provi

United States Patent Office 3,097,966
Patented July 16, 1963

3,097,966
PORTABLE STAND-UP TYPE BATHROOM SCALE
Mike A. Provi, Rockford, Ill., assignor to The Brearley Company, Rockford, Ill., a corporation of Illinois
Filed May 20, 1960, Ser. No. 30,525
6 Claims. (Cl. 177—239)

This invention relates to bathroom scales and is more particularly concerned with a portable standup type bathroom scale wherein the stand or base forms a part of the assembly and in no way interferes with its normal usage on the floor but enables it to be stood on end next to the wall when not in use to be out of the way and give additional floor space, which in many instances is much needed, especially in the smaller bathrooms in modern homes and apartments, the portability of the scale also being a big advantage from the standpoint of economy, a single scale being useful in various places to get the maximum service from it.

I am aware that others have devised bathroom scales that are fastened to the wall and are arranged to be swung outwardly onto the floor for use but that arrangement makes it necessary for special provisions for locating the scale far enough away from the wall in its unfolded position for more comfortable use, and these additional provisions add too much to the cost of the unit besides depriving it of its portability, and it is generally conceded that most purchasers of bathroom scales prefer the unit to be portable so that it can be used wherever preferred. The stand of my invention is accordingly designed to retain the important feature of portability and still have all of the other advantages desired without too much increase in cost.

The invention is illustrated in the accompanying drawings, in which:

FIGS. 1 and 2 are a front view and side view, respectively, of a portable bathroom scale of the stand-up type made in accordance with my invention, shown in the upright position, FIG. 2 showing the relationship of the scale to the floor and wall in that position;

FIG. 3 is a view corresponding to a portion of FIG. 2 showing a modified or alternative construction having the handle attached to the scale base instead of the platform;

FIG. 4 is a slightly enlarged vertical section on the line 4—4 of FIG. 1;

FIG. 5 is a side view on the same scale as FIGS. 1 and 2 showing the relationship of the parts in the horizontal operative position of the scale;

FIG. 6 is a plan view on the same scale as FIG. 4 of the base or stand by itself, and FIG. 7 is a rear view of FIG. 4 showing how the base is hingedly connected with the bottom of the scale.

Similar reference numerals are used to designate corresponding parts in these views.

Referring to the drawings, the bathroom scale designated generally by the reference numeral 10 in FIGS. 1 and 2 may be considered to be of any conventional type having a platform 11 on which the person to be weighed stands while the base 12 is disposed in a substantially horizontal position resting on a floor 13, the platform 11 being supported on a system of levers fulcrumed in the base 12, as illustrated, for example, in my Patents No. 2,667,387 and No. 2,668,045, whereby to stretch a weighing spring, the elongation of which is measured and through suitable intermediate mechanism indicated on a rotary dial, a portion of which is seen at 13 in FIG. 1, through a lens 14 mounted in an opening in the platform 11, so that the person standing on the platform can read his weight, as indicated on the dial 13. The base 12 has rubber pads or feet 15 on the bottom thereof at the four corners to provide good anti-slip support for the scale on the floor for safer use of the scale, the two lower ones also serving as buffers when the scale is standing next to a wall 16, as illustrated in FIG. 2, where the lower pads or feet 15 are arranged to have abutment with the baseboard 17. Should the scale be stood up carelessly and fall backward against the wall 16 the upper pads or feet 15 would then strike the wall and serve as buffers, preventing marring of the wall.

In accordance with my invention, in order to make a portable standup type bathroom scale out of an otherwise ordinary horizontal type bathroom scale, I provide a generally rectangular auxiliary supporting base plate 18 of ample dimensions in relation to the dimensions of the front end of the scale and hingedly connect the bottom 19 of the base 12 of the scale with the rear portion of the base plate 18 as at 20 and provide bumper pads 21 projecting upwardly from the base plate 18 in forwardly spaced relation to the hinges 20 to engage the front wall 22 of the base 12 to limit pivotal movement of the scale about the horizontal axis of the hinges 20, whereby to support the scale substantially in right angle relationship to the base plate 18 in the upright position of the scale shown in FIGS. 1 and 2, and I also provide a handle 23 on the upper end of the upright scale fixed to the rear wall 24 of the platform 11, but, if preferred, the handle may, as shown at 23' in FIG. 3, be fixed to the rear wall 25 of the base 12, that scale being identified generally by the reference numeral 10'.

It is therefore a simple matter in the operation of the scale to pick it up by its handle 23 or 23' from the upright position next to the wall 16 and place it in a horizontal position on the floor 13, as shown in FIG. 5, the base plate 18 in that position of the scale resting on the floor in front of the scale and not interfering in any way with the convenient use of the scale. The base plate 18 is preferably of sheet metal construction with downwardly bent marginal edge portions 26 on the front and two sides to rest on the floor, and there is an upwardly embossed portion 27 along the front of the base plate 18 having a depressed front face portion 28 where the trademark for indentification of the manufacturer of the scale can be displayed, as indicated at 29 in FIGS. 1 and 6, so that the trademark is always prominently displayed, whether the scale is in its folded upright position out of the way or in its normal operative position on the floor.

The hinges 20, of which there are two provided, as illustrated in FIG. 7, each comprises an elongated plate 30 of rectangular form bent transversely intermediate its ends, as indicated at 31, to provide an offset outer end portion 32 on the outer extremity of which a knuckle 33 is formed by curling a portion of reduced width on the end of the plate. This knuckle turns on a pin 34 that is gripped by its opposite ends in knuckles 35 formed by curling extensions provided on the rear edge of the base 18. Thus the cost of production is greatly reduced and a very serviceable construction is provided. The shoulder defined at 31 engages a marginal bead 36 provided on the bottom 19 of the base 12 so that when lugs 37 provided on the inner end of the plate 30 are engaged in holes 38 provided therefor in the bottom 19 only a single screw 39 is required for fastening the plate 30 to the bottom 19, this screw being entered in a threaded hole 40 provided therefor in the bottom 19.

It is only in scales of the kind disclosed in my earlier patents referred to above, wherein there are two coiled tension springs 41 stretched between the bottom 19 of the base 12 and the platform 11, holding the parts together under a predetermined tension, that it is practical to provide the handle 23 as a fixed extension on the rear of the platform, as seen in FIG. 2. In other scales not so constructed the handle should be provided, as shown at 23' in FIG. 3, as an extension off the rear of the base 12 of the scale, the construction being otherwise the same as described above.

It is believed the foregoing description conveys a good understanding of the objects and advantages of my invention. The appended claims have been drawn to cover all legitimate modifications and adaptations.

I claim:

1. A portable bathroom scale comprising a supporting base of generally rectangular form, a generally rectangular platform connected in assembled relation to the base but supported on and movable downwardly with respect thereto in a weighing operation, when the base and platform are horizontally disposed for use in weighing with the base resting on a floor, said scale being constructed to be adapted for use only in horizontal position resting on a floor and to permit its being stood on end on the floor, and a horizontal auxiliary base plate of generally rectangular form whose long dimension is approximately the same length as the width of said scale base and platform, said plate being hingedly connected on a horizontal axis on its one longitudinal edge portion with the bottom of said base on one end, whereby said scale is swingable upwardly from its horizontal operative position into upright position over said plate to rest thereon when not in use, the scale being swingable in the opposite direction relative to said plate to rest on the floor in horizontal position for use.

2. A portable bathroom scale as set forth in claim 1, including bumper pads of resilient shock absorbing material provided on and extending upwardly from said plate in spaced relation to said hinge axis, and arranged to have abutment with the end of said scale base to limit swinging movement of said scale relative to said plate with the scale approximately at right angles thereto and support the scale thereon with the end of the platform in spaced relation thereto.

3. A portable bathroom scale as set forth in claim 1, wherein said plate has its width from the rear hinged portion to the front portion increased so that the front portion projects appreciably forwardly from the upright scale for increased stability, to reduce likelihood of the scale tipping over forwardly when standing on end next to a wall, the wall preventing its tipping over rearwardly.

4. A portable bathroom scale as set forth in claim 1, wherein said plate is of sheet metal construction and its rear edge portion is formed to define integral hinge knuckles receiving pintles which, in turn, are mounted in coaxially aligned knuckles in hinge members on the base of said scale.

5. A portable bathroom scale as set forth in claim 1, wherein the scale base is of sheet metal construction and has spaced holes provided therein, a hinge member hingedly connected with said plate and having a lug entered in one of said holes, and a single screw extending from said hinge member into the other of said holes for fastening the hinge member to said base.

6. A portable bathroom scale as set forth in claim 1, including a handle for carrying the scale provided on the opposite end of the scale from the said base plate, whereby the scale may be lifted and carried by means of said handle or may be swung by means of said handle relative to the aforesaid base plate to or from either upright or horizontal position.

References Cited in the file of this patent

UNITED STATES PATENTS

| | | |
|---|---|---|
| 1,887,986 | Baldwin | Nov. 15, 1932 |
| 2,181,272 | Greenleaf | Nov. 28, 1939 |
| 2,321,585 | Cummings | June 15, 1943 |
| 2,641,460 | Larson | June 9, 1953 |
| 2,872,178 | Holland | Feb. 3, 1959 |
| 2,924,443 | Townsend et al. | Feb. 9, 1960 |

FOREIGN PATENTS

| | | |
|---|---|---|
| 1,046,905 | Germany | Dec. 18, 1958 |